United States Patent [19]

Hanke et al.

[11] Patent Number: 4,878,720
[45] Date of Patent: Nov. 7, 1989

[54] DEVICE FOR DEFLECTING A BUNDLE OF LIGHT RAYS

[75] Inventors: Peter Hanke, Eichenau; Wie Postanschrift, Munich, both of Fed. Rep. of Germany

[73] Assignee: Optische Werke G. Rodenstock, Munich, Fed. Rep. of Germany

[21] Appl. No.: 128,868

[22] Filed: Dec. 4, 1987

[30] Foreign Application Priority Data

Mar. 5, 1987 [DE] Fed. Rep. of Germany ....... 3707023

[51] Int. Cl.$^4$ .......................... G02B 26/10; G02B 5/04
[52] U.S. Cl. ....................................... 350/6.4; 350/286
[58] Field of Search .................. 350/6.4, 286, 6.1, 6.2, 350/569, 500, 6.9, 6.5

[56] References Cited

U.S. PATENT DOCUMENTS 4,606,601 8/1986 Starkweather ....................... 350/6.9

FOREIGN PATENT DOCUMENTS 11556 6/1899 United Kingdom ................ 350/286

OTHER PUBLICATIONS

The Opticial vol. 143, No. 3715 Jun. 15, 1962, pp. 588–591.

Primary Examiner—Bruce Y. Arnold
Assistant Examiner—Ronald M. Kachmarik
Attorney, Agent, or Firm—Antonelli, Terry & Wands

[57] ABSTRACT

A device for deviating a bundle of light rays into a plane comprises a deflecting prism of constant deviation rotatable about an axis. The deflecting prism is a Wollaston type quadrangular prism having two prism faces forming a right angle therebeween and having an axis of rotation oriented substantially perpendicularly to one of the two prism faces having the right angle therebetween.

20 Claims, 1 Drawing Sheet

DEVICE FOR DEFLECTING A BUNDLE OF LIGHT RAYS

The present invention relates to a device for deviating a bundle of rays, such as a light beam, into a plane by a deflecting prism of constant deviation which is rotatable about an axis, and an imaging system associated with the deflecting prism, especially an F-$\theta$ objective.

Such devices are utilized in scanner systems. In conventional scanner systems, a light beam emanating from a light source is deviated by a rotating deflecting element and reproduced, by an imaging system, as a light spot on a surface to be scanned. The rotating deflecting element serves for deflecting the light beam into a plane, for example. Scanning of the surface takes place line-by-line.

In such optical imaging systems, it is necessary for the scanning lines to be linear, successive scanning lines being arranged in parallel to one another, and the line spacing being constant. Under practical conditions, there will always be deviations from this ideal motion pattern of the light spot. Thus, it is possible, for example, for a deflecting element supported in inaccurately manufactured supports to assume a fluttering and vibrating movement, i.e., to wobble. Such effects impair an exact operation of the scanner system.

It is known to compensate for the interfering influence of wobbling with the aid of a pentaprism rotating about an axis which passes through one of the lateral faces of the pentaprism that are perpendicular to each other. The pentaprism provides a constant deviation or deflection of a light beam, independent from tilts of the axis of rotation of the prism, The use of pentaprism within a scanner system has been disclosed, for example, in U.S. Pat. No. 4,475,787.

If such a pentaprism is designed for minimun dimensions so that the entrance intercept length of the subsequent imaging system becomes as small as possible, then the sychronizing properties of the pentaprism set into rotation are unsatisfactory. This presents a grave disadvantage inasmuch as a pentaprism rotates at relatively large numbers of revolutions, i.e., at a high speed. Accordingly, the necessity arises of keeping damage to the deflecting element, due to high centrifugal forces, within limits by an expensive balancing of the drive motor and/or by relatively low numbers of revolutions.

It is therefore an object of the present invention to provide a deflecting prism of the type discussed hereinabove which can be manufactured in a simple way and has good synchronizing properties.

According to the present invention, the deflecting prism is provided as a Wollaston type quadrangular prism having an axis of rotation oriented substantially perpendicularly to one of the two prism faces forming a right angle with each other.

It has been found that if is possible, with the use of a Wollaston type quadrangular prism within a device of the type described above, to obtain a surprisingly advantageous construction for the deflecting element with respect to the distance between the axis of rotation and the center of gravity of the prism, with respect to the weight of the prism, and with respect to the distance between the axis of rotation and the prism part farthest removed therefrom, which determines the entrance intercept length of a subsequently arranged imaging system. As compared with a pentaprism designed for minimum dimensions, a Wollaston type quadrangular prism has a lower weight. The entrance intercept distance of the subsequent imaging system is maximally equal to the entrance intercept length required for a pentaprism. However, a special advantage resides in the feature that the Wollaston type quadrangular prism can be positioned so that the mechanical center of gravity of the quadrangular prism comes very close to the center of gravity of the impinging, parallel light rays. Since the Wollaston type quadrangular prism rotates about the center of gravity of the impinging, parallel light rays, there is almost no imbalance any longer, as compared with the pentaprism. Thus, especially at a high number of revolutions, the synchronizing properties are considerably improved.

A Wollaston type quadrangular prism exhibits two reflecting faces and two substantially non-reflecting faces with the mutually adjoining substantially non-reflecting faces forming an angle of 90° with each other. In accordance with a feature of the present invention, a conductance of the light beam would be possible wherein a bundle of rays of the light beam oriented in parallel to the axis of rotation enters the quadrangular prism through a first substantially nonreflective face which lies approximately perpendicularly to the axis of rotation, is then reflected on a first reflecting surface adjoining the first substantially non-reflecting surface, and then on a second reflecting surface, and finally exits again from the quadrangular prism by way of the second substantially nonreflecting surface.

In accordance with another feature of the present invention, an optimally small entrance intercept length of the imaging system can be achieved by providing the Wollaston type quadrangular prism two substantially nonreflective surfaces forming a right angle therebetween and two reflective surfaces with an index of refraction so that a bundle of light rays oriented substantially in parallel to the axis of rotation of the prism and entering the prism through a first substantially nonreflective surface is reflected on the first reflective surface lying in opposition to the entrance surface, is initially totally reflected on a second substantially nonreflective surface and subsequently totally reflected on the first substantially nonreflective surface, reflected on a second reflective surface and then exits through the second substantially nonreflective surface.

In order to be able to retain a correct and complete deflection of a bundle of light rays even in case of tilting of the axis of rotation of the Wollaston type quadrangular prism, the entrance surface of the quadrangular prism is chosen to be larger than the cross-sectional area of the bundle of light rays. In a preferred embodiment of the invention, the two prism faces oriented perpendicularly to each other and forming the entrance surface, in the direction perpendicular to their intersection line, have a width determined by the relationship of:

$$a = (1+2x) \cdot d \cdot \sqrt{2}$$

wherein
 d=diameter of the bundle of rays,
 x=distance in the width direction from the line of intersection to the periphery of the bundle of light rays, and
 $0.05 \leq x \leq 0.03$. Preferably, the relationship $0.1 \leq x \leq 0.2$ is provided for an optimally small entrance intercept length.

In accordance with other features of the present invention, the Wollaston type quadrangular prism has the axis of rotation thereof coinciding with the axis of the bundle of light rays. Additionally, the prism is preferably configured for deflection of the bundle of light rays by an angle of 90°.

These and futher objects, features and advantages of the present invention will become more apparent from the following description when taken in conjunction with the accompanying drawings which shown for purposes of illustration only, one embodiment in accordance with the present invention.

Figure 1:
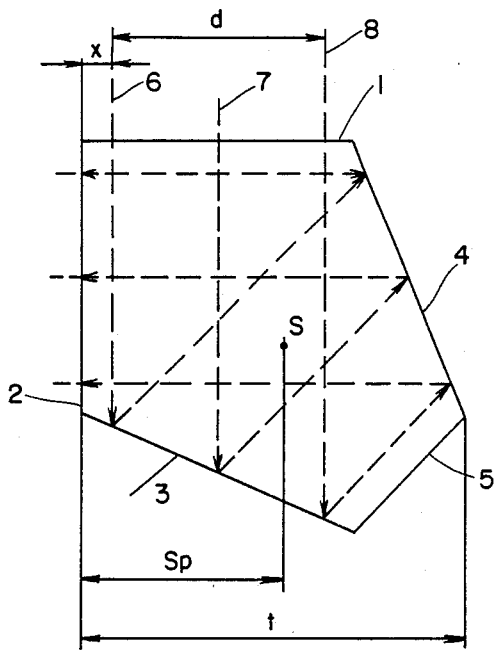
FIG. 1 is a section through a conventional pentaprism.
Figure 2:
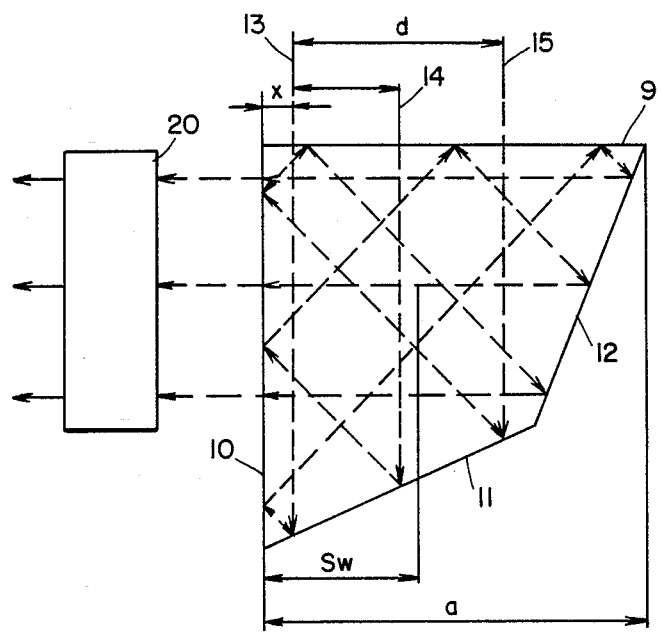
FIG. 2 is a section through a Wollaston type quadrangular prism according to the present invention associated with an imaging system.

Both FIGS. 1 and 2 illustrate deflecting prisms which deviate the entering bundle of light rays of a light beam by 90°. Although the imaging system or the holders and bearing for the respective prisms are generally not shown, FIG. 2 illustrates an imaging system 20 considered to include an F-$\theta$ lens arranged in the light output path from the prism. However, the imaging system associated with a prism can be arranged in the beam path in front of or behind the prism.

FIG. 1 shows a pentaprism having surfaces 1,2 without reflective coating, surfaces 3,4 with a reflective coating, and a futher surface 5. A bundle of light rays, for example, a laser beam, having the diameter d enters the pentaprism through the non-reflecting surface 1. After reflections on the reflecting surfaces 3,4, the beam exits through the non-reflecting surface 2 from the pentaprism. Numerals 6, 7, 8 denote rays of this bundle of rays. The pentaprism rotates about an axis, the position of which coincides with the position of the ray 7 oriented perpendicularly to the surface 1. The position of the center of gravity is denoted by S and the distance of this center of gravity to the surface 2 is denoted by $S_p$. The distance between the surface 2 and the intersecting edge of surfaces 4 and 5 is denoted by t.

FIG. 2 shows a Wollaston type quadrangular prism according to the present invention. It exhibits two non-reflecting surfaces 9, 10 forming a right angle, as well as two substantially reflecting surfaces 11, 12. The intersection of surfaces 10, 11 and the surfaces 9, 12 form an angle of 67.5°.

A bundle of light rays of a light beam, of which merely rays 13, 14, 15 are illustrated, enters the quadrangular prism perpendicularly through surface 9, is reflected on the reflecting surface 11, and is subsequently totally reflected on surfaces 10, 9. As shown, the surface 9 has a cross-sectional area larger than the cross-sectional area of the bundle of light rays. After reflection on surface 12, the bundle of rays exits from surface 10. The exiting bundle of rays is bent by 90° with respect to the entering beam. The axis 14 of the bundle of rays is also the axis of rotation of the quadrangular prism. The axis of rotation is oriented substantially perpendicularly to the prism face 9, i.e., the axis of rotation forms, with the vertical on the prism surface 9, maximally an angle of about 4°, dependent on the refractive index of the glass.

FIG. 2 illustrates the ideal instance of an axis of rotation that is not tilted. The impinging light rays are parallel to one another as well as to the surface 10. Symbol a denotes the distance between surface 10 and the intersection edge between surface 9 and 12. In this embodiment, the bundle of rays has a spacing x from surface 10 of, for example, 0.15 d. The distance x is necessary so that, even in case of a tilt of the axis of rotation of the prism, a correct and complete deflection of bundle of rays is maintained. More particular, a is determined in accordance with the following equation:

$$a = (1+2x) \cdot d \cdot \sqrt{2}$$

where d is the diameter of the bundle of rays and $0.05 \leq x \leq 0.3$ In a preferred embodiment, the relationship of $0.1 \leq x \leq 0.2$ is provided.

The beam deviation effected by the quadrangular prism is not affected by tilting of the prism axis of rotation. Even in case of tilting, the angle between the exiting beam and the entering beam remains constant, the exiting beam being merely shifted in parallel to itself. By means of the subsequent arranged imaging optic system 20, in the present example, an F-$\theta$ optic of a scanner system, the mutually parallel bundle of light rays are focused.

As compared with the pentaprism, the center of gravity of the Wollaston type quadrangular prism (distance $S_w$ from surface 10) lies considerably closer to the axis of rotation of the quadrangular prism than the center of gravity of the pentaprism (distance Sp from surface 2 - FIG. 1) to its axis of rotation. The quadrangular prism thus exhibits almost no imbalance any longer. Especially at a high number of revolutions, the synchronizing properties thus are considerably improved as compared with the pentaprism. The spacings t and a coincide, i.e., in both the pentaprism and quadrangular prism the same entrance intercept length is obtained for the imaging system.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. In a light scanner system including a rotating device for deviating a light beam of a bundle of light rays into a plane, the rotating device comprising a deflecting prism of constant deviation rotatable about an axis, the improvement comprising the deflecting prism being a Wollaston type quadrangular prism having two prism faces forming a right angle therebetween and having an axis of rotation oriented substantially perpendicular to one of the two prism faces having the right angle therebetween, the quadrangular prism having a center of gravity substantially close to the axis of rotation thereof, wherein the quadrangular prism enables rotation at high speed without expensive balancing as necessitated when a pentaprism is utilized, the quadrangular prism having the center of gravity closer to the axis of rotation thereof than the distance between the center of gravity and the axis of rotation of a pentaprism.

2. A device according to claim 1, wherein the two prism faces of the quadrangular prism having the right angle therebetween are first and second substantially nonreflective surfaces, the quadrangular prism having first and second reflective surfaces and having an index of refraction so that a bundle of light rays oriented substantially in parallel to the axis of rotation enter the quadrangular prism through the first substantially nonreflective surface, the first reflective surface being disposed in opposition to the entrance first substantially nonreflective surface for receiving the bundle of light rays and reflecting the bundle of light rays toward the second substantially nonreflective surface, the second substantially nonreflective surface being disposed for receiving the reflected bundle of light rays from the firs reflecting surface and totally reflecting the bundle of light rays toward the first substantially nonreflective surface, the first substantially nonreflective surface receiving the bundle of light rays reflected from the second substantially nonreflective surface and reflecting the bundle of light rays towards the second reflective surface, the second reflective surface reflecting the bundle of light rays toward the second substantially nonreflective surface, the second substantially nonreflective surface forming an exit surface for the bundle of light rays so as to enable the bundle of light rays to pass therethrough.

3. A device according to claim 2, wherein the light beam is a substantially collimated bundle of light rays, the prism rotates about substantially the center of the bundle of light rays, one of the two prism surfaces having a right angle therebetween is an entrance surface for the bundle of light rays, at least the entrance surface having a width extending a in a direction perpendicular to the line of intersection of the two prism surfaces having the right angle therebetween of:

$$a \times (1+2x) \cdot d \cdot \sqrt{2}$$

wherein
  d = diameter of the bundle of light rays,
  x = distance in the width direction from the line of intersection of the two prism surfaces to the near periphery of the bundle of light rays, a, d and x being in the same units of measure, and
  $0.05 \leq x \leq 0.2$.

4. A device according to claim 3, wherein the distance x has the relationship of $0.1 \leq x \leq 0.2$.

5. A device according to claim 4, wherein the axis of rotation of the quadrangular prism coincides with the axis of the bundle of light rays.

6. A device according to claim 5, wherein the quadrangular prism deflects the bundle of light rays by an angle of 90°.

7. A device according to claim 4, wherein the quadrangular prism deflects the bundle of light rays by an angle of 90°.

8. A device according to claim 3, wherein the axis of rotation of the quadrangular prism coincides with the axis of the bundle of light rays.

9. A device according to claim 3, wherein the quadrangular prism deflects the bundle of light rays by an angle of 90°.

10. A device according to claim 3, wherein one of the two prism surfaces having a right therebetween is an entrance surface having a cross-sectional area larger than the cross-sectional area of the bundle of light rays.

11. A device according to claim 10, further comprising an imaging optical system associated with the quadrangular prism.

12. A device according to claim 11, wherein the imaging optical system includes an F-θ lens arranged for receiving the bundle of light rays exciting from the quadrangular prism.

13. A device according to claim 1, wherein the light beam is a substantially collimated bundle of light rays, the prism rotates about substantially the center of the bundle of light rays, one of the two prism surfaces having a right angle therebetween is an entrance surface for the bundle of light rays, at least the entrance surface having a width a extending in a direction perpendicular to the line of intersection of the two prism surfaces having the right angle therebetween of:

$$a + (1+2X) \cdot d \cdot \sqrt{2}$$

wherein
  d = diameter of the bundle of light rays,
  x = distance in the width direction from the line of intersection of the two prism surfaces to the near periphery of the bundle of light rays, a, d and x being in the same units of measure, and
  $0.05 \leq x \leq 0.3$.

14. A device according to claim 13, wherein the distance x has the relationship of $0.1 \leq x \leq 0.2$.

15. A device according to claim 1, wherein the axis of rotation of the quadrangular prism coincides with the axis of the bundle of light rays.

16. A device according to claim 1, wherein the quadrangular prism deflects the bundle of light rays by an angle of 90°.

17. A device according to claim 1, wherein one of the two prism surfaces having a right angle therebetween is an entrance surface having a cross-sectional area larger than the cross-sectional area of the bundle of light rays.

18. A device according to claim 1, further comprising an imaging optical system associated with the quadrangular prism.

19. A device according to claim 18, wherein the imaging optical system includes an F-θ lens arranged for receiving the bundle of light rays exiting from the quadrangular prism.

20. A device according to claim 1, wherein the two prism faces of the quadrangular prism having the right angle therebetween form first and second substantially non-reflective surfaces enabling the bundle of light rays to respectively one of enter and exit therethrough and enabling internal reflection of the bundle of light rays thereat within the quadrangular prism so that the quadrangular prism enables four reflections of the bundle of light rays therein.

* * * * *

UNITED STATES PATENT AND TRADEMARK OFFICE
CERTIFICATE OF CORRECTION

PATENT NO. : 4,878,720
DATED : Nov. 7, 1989
INVENTOR(S) : Hanke et al.

It is certified that error appears in the above-identified patent and that said Letters Patent is hereby corrected as shown below:

IN THE TITLE PAGE:

Column 1

Delete "[75] Inventors: Peter Hanke, Eichenau; Wie Postanschrift, Munich, both of Fed. Rep. of Germany" and insert --[75] Inventors: Peter Hanke, Eichenau; Jakob Bleicher, Munich; Wie Postanschrift, both of Fed. Rep. of Germany--

Signed and Sealed this

Seventh Day of May, 1991

Attest:

HARRY F. MANBECK, JR.

*Attesting Officer*     *Commissioner of Patents and Trademarks*